(12) United States Patent
Aono (10) Patent No.: US 7,170,676 B2
(45) Date of Patent: Jan. 30, 2007

(54) ILLUMINATION SWITCHING APPARATUS AND METHOD

(75) Inventor: Yasushi Aono, Yokohama (JP)

(73) Assignee: Olympus Corporation, Tokyo (JP)

( * ) Notice: Subject to any disclaimer, the term of this patent is extended or adjusted under 35 U.S.C. 154(b) by 114 days.

(21) Appl. No.: 10/798,775

(22) Filed: Mar. 10, 2004

(65) Prior Publication Data
US 2004/0196549 A1 Oct. 7, 2004

(30) Foreign Application Priority Data
Mar. 13, 2003 (JP) ............................. 2003-068317

(51) Int. Cl.
*G02B 21/06* (2006.01)
(52) U.S. Cl. ..................... 359/388; 359/385
(58) Field of Classification Search .............. 359/388
See application file for complete search history.

(56) References Cited

U.S. PATENT DOCUMENTS 5,552,892 A * 9/1996 Nagayama .................. 356/401
6,501,551 B1 * 12/2002 Tearney et al. .............. 356/477
6,628,385 B1 * 9/2003 Osipchuk et al. ............ 356/318
6,924,490 B2 * 8/2005 Natori ..................... 250/458.1
2002/0097489 A1 * 7/2002 Kawano et al. ............. 359/388
2003/0058530 A1 * 3/2003 Kawano ...................... 359/385
2003/0086163 A1 * 5/2003 Aono et al. ................ 359/388
2004/0001253 A1 * 1/2004 Abe et al. .................... 359/388

FOREIGN PATENT DOCUMENTS

JP 9-159922 A 6/1997
JP 2002-31762 A 1/2002

* cited by examiner

*Primary Examiner*—Drew A. Dunn
*Assistant Examiner*—Joshua L. Pritchett
(74) *Attorney, Agent, or Firm*—Frishauf, Holtz, Goodman & Chick, P.C.

(57) ABSTRACT

The optical path used is switched between a first optical path and second optical path. The first optical path is used to make illumination light, output from a light source, transmits along the optical axis of an objective via an illumination system. The second optical path is used to guide the illumination light, output from the light source, to a transmits via the illumination system and the objective, thereby illuminating the target in a total reflection observation mode.

9 Claims, 9 Drawing Sheets

ILLUMINATION SWITCHING APPARATUS AND METHOD

CROSS-REFERENCE TO RELATED APPLICATIONS

This application is based upon and claims the benefit of priority from prior Japanese Patent Application No. 2003-068317, filed Mar. 13, 2003, the entire contents of which are incorporated herein by reference.

BACKGROUND OF THE INVENTION

1. Field of the Invention

The present invention relates to an illumination switching apparatus and method for switching illumination for a sample through an objective between total reflection illumination and standard fluorescent observation illumination.

2. Description of the Related Art

Figure 12:
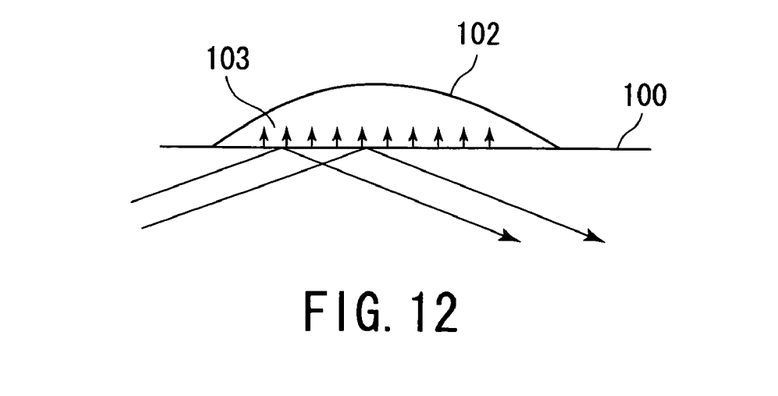
FIG. 12 is a view useful in explaining observation based on total reflection of fluorescent light.

Attention is now being paid to total internal reflection fluorescence microscopes (TIRFM). As shown in FIG. 12, total internal reflection fluorescence microscopes totally reflect light at the border between a cover slip 100 and sample 102. At this time, evanescent light, which occurs in a small region of several hundreds of nanometers or less in the sample 102, excites a fluorescent material in the sample. As a result, fluorescent light is generated in the small region near the cover slip 100. Through total internal reflection fluorescence microscopes, only this fluorescent light is observed. Since total internal reflection fluorescence microscopes provide a very dark background, observation with high contrast and observation using vary weak fluorescent light can be realized.

Evanescent light 103 does not reach the deep portion of the sample 102 located away from the cover slip 100. Accordingly, the deep portion cannot be observed.

Therefore, switching between observation using total reflection of fluorescent light and observation using standard fluorescent light enables the portion of the sample 102 near the cover slip 100 to be observed with high contrast, and also the entire sample 102 to be observed. In particular, when physiological phenomena of high reaction speed are being observed, prompt switching is required between observation using total reflection of fluorescent light and observation using standard fluorescent light.

Jpn. Pat. Appln. KOKAI Publications Nos. 9-159922 and 2002-31762, for example, disclose switching through an objective between observation using total reflection of fluorescent light and observation using standard fluorescent light. Specifically, Jpn. Pat. Appln. KOKAI Publication No. 9-159922 discloses a technique for parallel-moving an illumination light reflection mirror toward the objective, thereby moving the incident position of the light on the objective away from the optical axis of the lens, resulting in a change in the angle of emergence of light from the lens. Jpn. Pat. Appln. KOKAI Publication No. 2002-31762 discloses a technique for varying the angle of a mirror provided in the middle of the illumination system, thereby varying the angle of emergence of light from the objective.

However, in the structure of Jpn. Pat. Appln. KOKAI Publication No. 9-159922, in which the mirror provided in the middle of the illumination system is moved parallel, or in the structure of Jpn. Pat. Appln. KOKAI Publication No. 2002-31762, in which the angle of the mirror is varied, the single mirror must be reciprocated between precisely determined positions when switching is performed between observation using total reflection of fluorescent light and observation using standard fluorescent light.

Such mirror reciprocation makes it difficult to enhance the accuracy of the position at which the mirror is stopped, in proportion to the speed of switching. Unless the mirror stop position accuracy can be enhanced, when switching is performed twice, the observation image before switching cannot be exactly reproduced.

If illumination light has a large cross section at the mirror position, a large mirror is used. This imparts a limit on the speed of switching between observation using total reflection of fluorescent light and observation using standard fluorescent light. The switching period employed where the mirror is moved parallel is, for example, 0.5 sec. at minimum. On the other hand, the switching period employed where the mirror angle is varied is, for example, 0.1 sec. at minimum. Thus, both cases do not satisfy the demand for a short switching period of the order of $1/100$ sec. needed for switching between observation using total reflection of fluorescent light and observation using standard fluorescent light.

BRIEF SUMMARY OF THE INVENTION

According to an aspect of the invention, there is provided an illumination switching apparatus comprising: an objective having a numerical aperture which enables total reflection illumination to be performed on a target; a light source section which outputs illumination light; an illumination system which receives, the illumination light output from the light source section and guides it to the objective and an illumination switching section which selects one of a first optical path and a second optical path, when the first optical path is selected, the illumination light output from the light source section being guided through the illumination system to transmit along an optical axis of the objective and illuminate the target in a standard observation mode, when the second optical path is selected, the illumination light output from the light source section being guided through the illumination system and the objective to illuminate the target in a total reflection observation mode.

According to another aspect of the invention, there is provided an illumination switching method comprising: causing a first shutter mechanism provided at a laser output terminal of a first laser oscillator to pass therethrough or interrupt a first laser beam output from the first laser oscillator; causing a second shutter mechanism provided at a laser output terminal of a second laser oscillator to pass therethrough or interrupt a second laser beam output from the second laser oscillator; guiding the first laser beam, having passed through the first shutter mechanism, along an optical axis of an objective via an illumination system, thereby illuminating a target by standard observation fluorescent light; and guiding the second laser beam, having passed through the second shutter mechanism, through the objective via the illumination system, thereby illuminating the target using total reflection of observation fluorescent light.

DETAILED DESCRIPTION OF THE INVENTION

First, a first embodiment of the invention will be described with reference to the accompanying drawings.

Figures 1, 2:
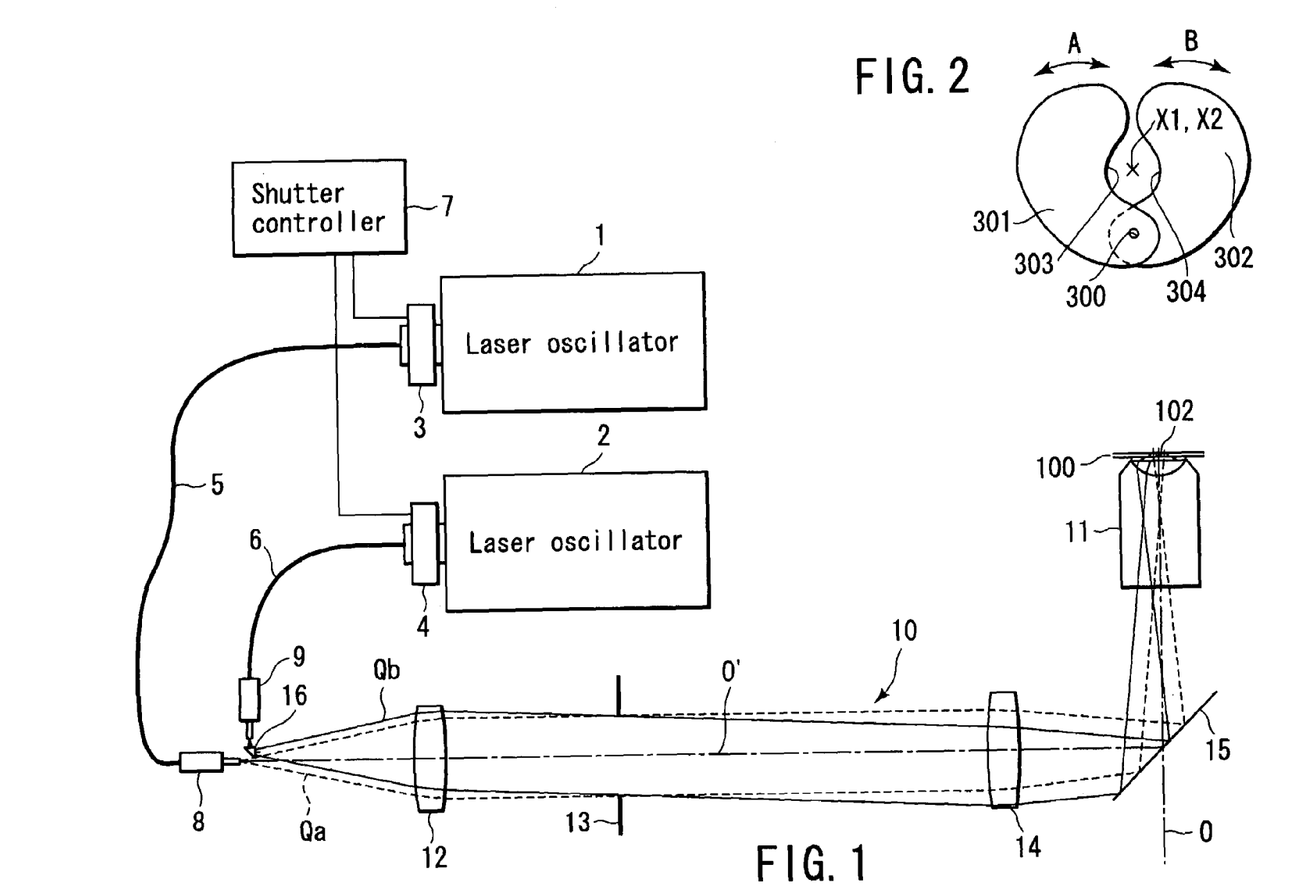
FIG. 1 is a view illustrating an illumination switching apparatus according to a first embodiment of the invention.
FIG. 2 is examples of first and second shutter mechanisms incorporated in the apparatus.

FIG. 1 is a view illustrating the first embodiment in which an illumination switching apparatus is incorporated in a microscope. As shown, first and second laser oscillators 1 and 2 are provided. First and second shutter mechanisms 3 and 4 are attached to the output terminals of the first and second laser oscillators 1 and 2, respectively. The first and second shutter mechanisms 3 and 4 are opened and closed by a shutter controller 7. First and second optical fibers 5 and 6 are connected to the output terminals of the first and second shutter mechanisms 3 and 4, respectively.

The first and second shutter mechanisms 3 and 4 have, for example, a mechanical structure. FIG. 2 shows a structure example of each of the first and second shutter mechanisms 3 and 4. As shown, two blades 301 and 302, for example, are attached to a shutter rotation axis 300 so that they can rotate about the axis 300 in directions indicated by arrows A and B, respectively. The blades 301 and 302 are formed substantially semicircular, and have recesses 303 and 304, respectively. The shutter rotation axis 300 is attached to one end of each of the blades 301 and 302. The first and second shutter mechanisms 3 and 4 are arranged such that when the blades 301 and 302 are open, the optical axes X1 and X2 of the first and second laser oscillators 1 and 2 pass between the blades 301 and 302. The first and second shutter mechanisms 3 and 4 may be electronic shutters formed of, for example, liquid crystal shutters, AOTF, etc.

The shutter controller 7 switches the mode of the apparatus between the mode for observation using total reflection of fluorescent light (hereinafter referred to as a "total reflection observation mode") and the mode for observation using standard fluorescent light (hereinafter referred to as a "standard observation mode"). In the total reflection observation mode, the shutter controller 7 opens the second shutter mechanism 4 and closes the first shutter mechanism 3. On the other hand, in the standard observation mode, the shutter controller 7 closes the second shutter mechanism 4 and opens the first shutter mechanism 3. Further, the shutter controller 7 has a high-speed switching mode for switching the mode of the apparatus between the total reflection observation mode and standard observation mode in a short period of the order of $\frac{1}{100}$ sec.

The first and second optical fibers 5 and 6 have first and second laser emission sections 8 and 9, respectively. The first optical fiber 5 and first laser emission section 8 provide a first light transmission section. The second optical fiber 6 and second laser emission section 9 provide a second light transmission section.

First and second laser beams emitted from the first and second laser emission sections enter an illumination system 10. The illumination system 10 guides, to the optical observation path of the microscope, the first and second laser beams emitted from the first and second laser emission sections 8 and 9. In the microscope, an objective 11 is provided across the optical axis O of the optical observation path.

The illumination system 10 comprises a collimate lens 12, aperture 13 and condensing lens 14 arranged along an optical axis O' thereof. The collimate lens 12 converts, into parallel light, the laser beams (diverged beams) emitted from the first and second laser emission sections 8 and 9. The collimate lens 12 has so-called convex-lens power. The condensing lens 14 converts, into converged light, the laser beams passing through the collimate lens. The condensing lens 14 also has convex-lens power.

The distance between the collimate lens 12 and aperture 13 corresponds to the focal distance f1 of the collimate lens 12. The distance between the aperture 13 and condensing lens 14 corresponds to the focal distance f2 of the condensing lens 14. Thus, the illumination system 10 has a telecentric optical system structure.

The optical axis O' of the illumination system 10 intersects the optical axis O of the observation system. A dichroic mirror 15 is provided at the intersection of the optical axes O' and O. A cover slip 100 is set on the objective 11 across the optical axis O. A sample 102 is placed on the cover slip 100.

The emission direction of the first laser emission section 8 coincides with the optical axis O' of the illumination system 10. Thus, the first laser emission section 8 emits a first laser beam (hereinafter referred to as "illumination light Qa") along the optical axis O' of the illumination system 10.

Since the first laser emission section 8 is located as the above, the illumination light Qa emitted therefrom passes through the illumination system 10, reflects on the dichroic mirror 15, enters the objective 11 and illuminates the sample 102. Thus, the sample 102 is illuminated by standard observation fluorescent light (reflected illumination).

On the other hand, the emission direction of the second laser emission section 9 is perpendicular to the optical axis O' of the illumination system 10. Thus, the second laser emission section 9 emits a second laser beam (hereinafter referred to as "illumination light Qb") at the right angles relative to the optical axis O' of the illumination system 10.

A total reflection microprism 16 is provided across the laser emission direction of the second laser emission section 9, displaced from the optical axis O' by a predetermined distance. The total reflection microprism 16 perpendicularly reflects the illumination light Qb emitted from the second laser emission section 9, such that the light Qb is parallel to but offset from the optical axis O'.

More specifically, the illumination light Qb is offset from the optical axis O' by, for example, about several millimeters, and is made to transmit parallel thereto. That is, the distance between the illumination light beams Qa and Qb is about several millimeters.

Since the total reflection microprism 16 is located as the above, the illumination light Qb reflected by the prism 16 transmits through the illumination system 10, reflects on the dichroic mirror 15 such that it is parallel to but offset from the optical axis O of the optical observation system, and enters the objective 11. Thus, the sample 102 is illuminated by totally reflected observation fluorescent light (reflected illumination).

The emergence angle of the illumination light Qb from the objective 11 is determined solely by the offset from the optical axis O of the light Qb when incident on the objective 11. The angle of emergence thus depends directly on the point of incidence of the second laser beam on the total reflection microprism 16, which reflects the beam by total internal reflection.

In other words, the total reflection microprism 16 is located at a position at which the incident angle of the illumination light Qb with respect to the cover slip 100 is larger than the critical angle of total reflection. The total reflection microprism 16 is located such that the illumination light Qb.

Figures 3, 4:
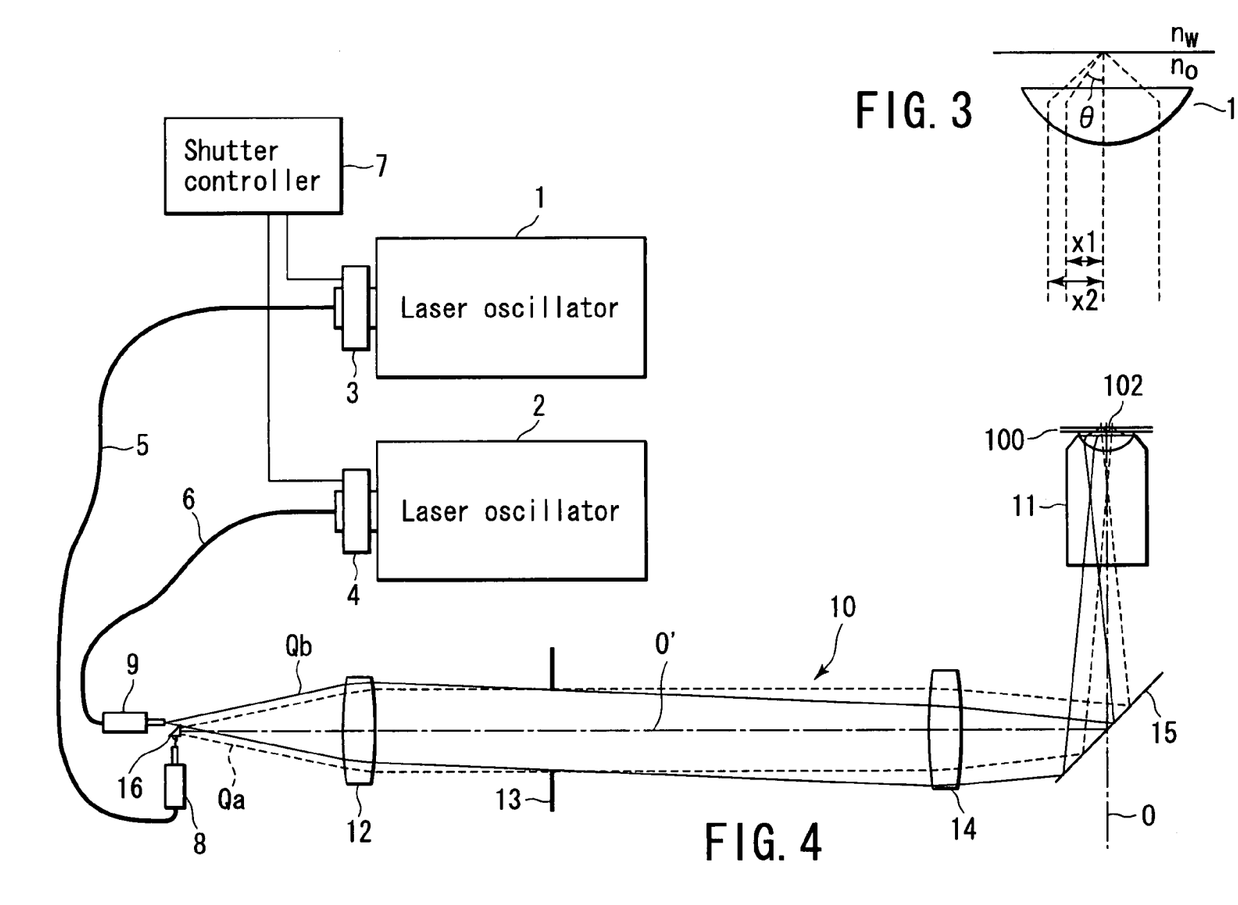
FIG. 3 is a schematic view illustrating the conditions for total reflection.
FIG. 4 is a view illustrating an illumination switching apparatus according to a second embodiment of the invention.

FIG. 3 is a schematic view useful in explaining the conditions for total reflection. For example, the refractive index $n_o$ of oil or glass is 1.52, while that $n_w$ of water is 1.33. Assuming that the incident angle of a laser beam is $\theta$, if the angle $\theta$ satisfies $\sin \theta > 1.33/1.52$, the laser beam totally reflects at the border between oil or glass and water.

The aperture NA of the objective 11 is given by $$NA = \text{(refraction index } n_o \text{ of oil or glass)} \times \sin \theta.$$

Accordingly, when the aperture NA of the objective 11 is greater than the refraction index $n_w$ of water (=1.33), the laser beam totally reflects.

Specifically, if an objective 11 with a magnification power of 60 is used, the focal distance f of the objective 11 is given by $$f = (180 \text{ mm}/60) = 3 \text{ mm}$$

where 180 mm represents the focal distance of the image-forming lens (not shown) for converting, into converged light, the observation light passing through the objective 11, and is determined by the optical structure of the microscope.

The distance x1, for total reflection of the laser beam, at the focal position of the lens 11 between the optical axis of the objective 11 and the incident position of the laser beam on the lens 11 is given by $$x1 = 3 \text{ mm (the focal distance of the objective 11)} \times 1.33 \text{ (the refraction index } n_w \text{ of water)} = 3.99.$$

The pupil diameter x2 of the objective 11 is given by $$x2 = 3 \text{ mm (the focal distance of the objective 11)} \times 1.45 \text{ (the aperture } NA \text{ of the objective 11)} = 4.35.$$

Accordingly, the laser incident angle range for allowing total reflection of the laser beam is from x1 to x2. Therefore, the total reflection microprism 16 is located so that the laser beam laser incident angle of the laser beam falls within the range of x1 to x2. The location of the prism 16 is changed in accordance with the projection magnification of the illumination system 10.

The operation of the apparatus constructed as above will now be described.

Firstly, in the standard observation mode, the shutter controller 7 closes the second shutter mechanism 4 and opens the first shutter mechanism 3. The first laser oscillator 1 outputs a first laser beam. The first laser beam enters the first optical fiber 5 via the first shutter mechanism 3, passes through the first optical fiber 5 and reaches the first laser emission section 8.

Illumination light Qa emitted from the first laser emission section 8 is divergent light. The divergent illumination light Qa is converted into parallel light by the collimate lens 12. The parallel illumination light Qa passes through the aperture 13 and condensing lens 14, where it is converted into condensed light. The condensed illumination light Qa is reflected by the dichroic mirror 15 and converged at the rear focal position of the objective 11. The convergent illumination light Qa passing through the objective 11 as parallel light enters the cover slip 100.

At this time, since the illumination light Qa enters the cover slip 100 after passing along the optical axis O' of the illumination system and the optical axis O of the optical observation system, it illuminates the sample 102 as light for standard fluorescent observation.

On the other hand, in the total reflection observation mode, the shutter controller 7 opens the second shutter mechanism 4 and closes the first shutter mechanism 3. The second laser oscillator 2 outputs a second laser beam. The second laser beam enters the second optical fiber 6 via the second shutter mechanism 4, passes through the second optical fiber 6 and reaches the second laser emission section 9. Illumination light Qb emitted from the second laser emission section 9 is divergent light.

The divergent illumination light Qb passes through the collimate lens 12, where it becomes parallel light having a predetermined inclination. The parallel illumination light Qb passes through the aperture 13 and condensing lens 14, where it is converted into condensed light offset from but parallel to the optical axis O' of the illumination system. The condensed illumination light Qb is reflected by the dichroic mirror 15 and converged at the rear focal position of the objective 11. The illumination light Qb from the objective 11 enters the cover slip 100.

The reflection position on the total reflection microprism 16 is set such that the incident angle of the illumination light Qb with respect to the cover slip 100 is larger than the critical angle of total reflection. As a result, the illumination light Qb reflected from the total reflection microprism 16 becomes light for total reflection fluorescent observation.

Thus, the illumination light Qb enters the cover slip 100 at an angle larger than the critical angle of total reflection, with the result that evanescent light 103 is generated in a small region of several hundreds nanometers or less within the sample 102. The fluorescent material contained in the sample 102 is energized by the evanescent light 103. As a result, only fluorescent light generated by the fluorescent material in the small region near the cover slip 100 is observed.

In the high-speed switching mode, the shutter controller 7 alternately switches the mode of the apparatus between the total reflection observation mode and standard observation mode in a short period of the order of, for example, 1/100 sec. More specifically, the first and second shutter mechanisms 3 and 4 are provided at the output terminals of the first and second laser oscillators 1 and 2, respectively. The diameter of the first and second laser beams at the output terminals of the first and second oscillators 1 and 2 is small, thereby reducing the area required for shading the first and second laser beams. This enables the period required for shading the first and second laser beams to be shortened to the order of, for example, 1/100 sec. Thus, the mode for observing the sample 102 placed on the cover slip 100 can be switched at high speed between the standard fluorescent observation mode and total reflection observation mode.

As described above in the first embodiment, the first and second shutter mechanisms 3 and 4, which can be switched from one to the other at high speed, are provided at the output terminals of the first and second laser oscillators 1 and 2, respectively. Further, the total reflection microprism 16 is provided at a position at which the incident angle of illumination light with respect to the cover slip 100 is larger than the critical angle of total reflection. The illumination light Qa emitted from the first laser emission section 8 is made to pass along the optical axis O of the illumination system. As a result, the mode for observing the sample 102 placed on the cover slip 100 can be switched in a very short period of the order of, for example, 1/100 sec. between the standard fluorescent observation mode and total reflection observation mode.

The first and second laser beams emitted from the first and second laser oscillators 1 and 2 directly enter the first and second shutter mechanisms 3 and 4, respectively, without being subjected to shaping. The diameter of the first and second laser beams is as small as, for example, about 1 mm. Accordingly, the shutter openings of the first and second shutter mechanisms 3 and 4 can be made small, with the result that the shutter mechanism 3 and 4 can be opened and closed at high speed.

Since the illumination light beams Qa and Qb used for standard observation and total reflection observation, respectively, are made to pass through different optical paths, they are completely independent of each other. This also enables high-speed switching of the illumination light beams Qa and Qb.

As stated above, the apparatus of the invention merely switch the illumination light beams Qa and Qb from one to another, which differs from the prior art in which the mirror is shifted. In the invention, even if standard observation and total reflection observation are switched at high speed, the images obtained by standard observation and total reflection observation can be reproduced accurately.

Further, since the total reflection microprism 16 is very small, it can be located close to the optical axis O' of the illumination system. As a result, the distance between the illumination light Qa used for standard fluorescent observation and the illumination light Qb used for total reflection observation can be reduced to, for example, several millimeters. It should be noted that the distance between the illumination light Qa and the illumination light Qb cannot be reduced to several millimeters simply by arranging the first and second laser emission sections 8 and 9 parallel to each other. This is because the emission sections 8 and 9 provide mechanical contact sections at the ends of the first and second optical fibers 5 and 6, respectively, therefore must have a diameter φ of about 5 to 10 mm.

A second embodiment of the invention will be described with reference to FIG. 4. Elements similar to those in FIG. 1 are denoted by corresponding reference numerals, and no detailed description is given thereof.

FIG. 4 shows an illumination switching apparatus, according to the second embodiment, which is used in a microscope. The emission direction of the first laser emission section 8 is set perpendicular to the optical axis O' of the illumination system. As a result, the first laser emission section 8 emits illumination light Qa in a direction perpendicular to the optical axis O'.

The total reflection microprism 16 is provided across the emission direction of the first laser emission section 8. The microprism 16 is arranged on the optical axis O' of the illumination system, and used to guide, to the optical axis O' of the illumination system, the illumination light Qa emitted from the first laser emission section 8.

Since the total reflection microprism 16 is located as the above, the illumination light Qa emitted from the first laser emission section 8 passes through the illumination system 10, reflects on the dichroic mirror 15, passes along the optical axis O of the optical observation system, enters the objective 11 and illuminates the sample 102 in the standard fluorescent observation mode.

The second laser emission section 9 is located such that its emission direction is offset by a predetermined distance from the optical axis O' of the illumination system. The second laser emission section 9 emits illumination light Qb in a direction parallel to the optical axis O'.

Since the second laser emission section 9 is located as the above, the illumination light Qb emitted therefrom transmits through the illumination system 10, reflects on the dichroic mirror 15. As a result, the illumination light Qb transmits in parallel with the optical axis O of the optical observation system, offset therefrom, enters the objective 11 and illuminates the sample 102. Thus, the sample 102 is illuminated in the total reflection observation mode.

As stated above, the positional relationship between the first and second laser emission sections 8 and 9 is opposite between the first and second embodiments. That is, the illumination light Qa emitted from the first laser emission section 8 is reflected by the total reflection microprism 16 to pass along the optical axis O'. Further, the second laser emission section 9 is offset by a predetermined distance from the optical axis O' of the illumination system 10, thereby making the illumination light Qb offset from but parallel to the optical axis O'. The second embodiment constructed as above can provide the same advantage as the first embodiment.

A third embodiment of the invention will be described with reference to FIGS. 5 and 6. Elements similar to those in FIG. 1 are denoted by corresponding reference numerals, and no detailed description is given thereof.

Figure 5:
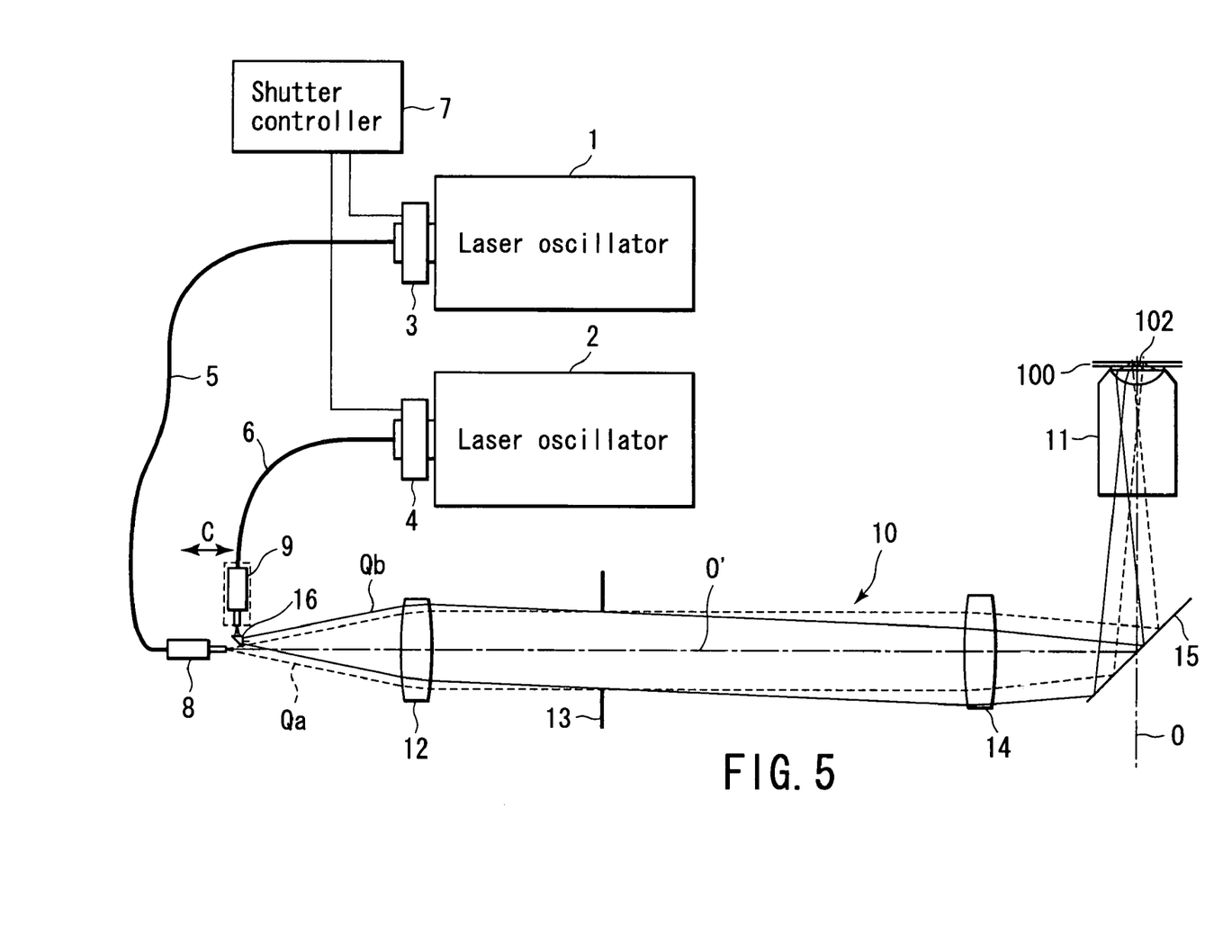
FIG. 5 is a view illustrating an illumination switching apparatus according to a third embodiment of the invention.

FIG. 5 shows an illumination switching apparatus, according to the third embodiment, which is used in a microscope. The microprism 16 is fixed in position. The second laser emission section 9 is movable along the optical axis O' of the illumination system 10 (i.e., in the directions indicated by arrow C).

Since the second laser emission section 9 is movable relative to the microprism 16, offset of the illumination light Qb from the optical axis O' can be adjusted, which enables the incident angle of the illumination light Qb with respect to the cover slip 100 to be adjusted in the total reflection observation mode.

Instead of making the second laser emission section 9 movable along the optical axis O' of the illumination system 10 (in the directions indicated by arrow C), the second laser emission section 9 may be made movable in the direction perpendicular to the optical axis O', together with the microprism 16.

Figure 6:
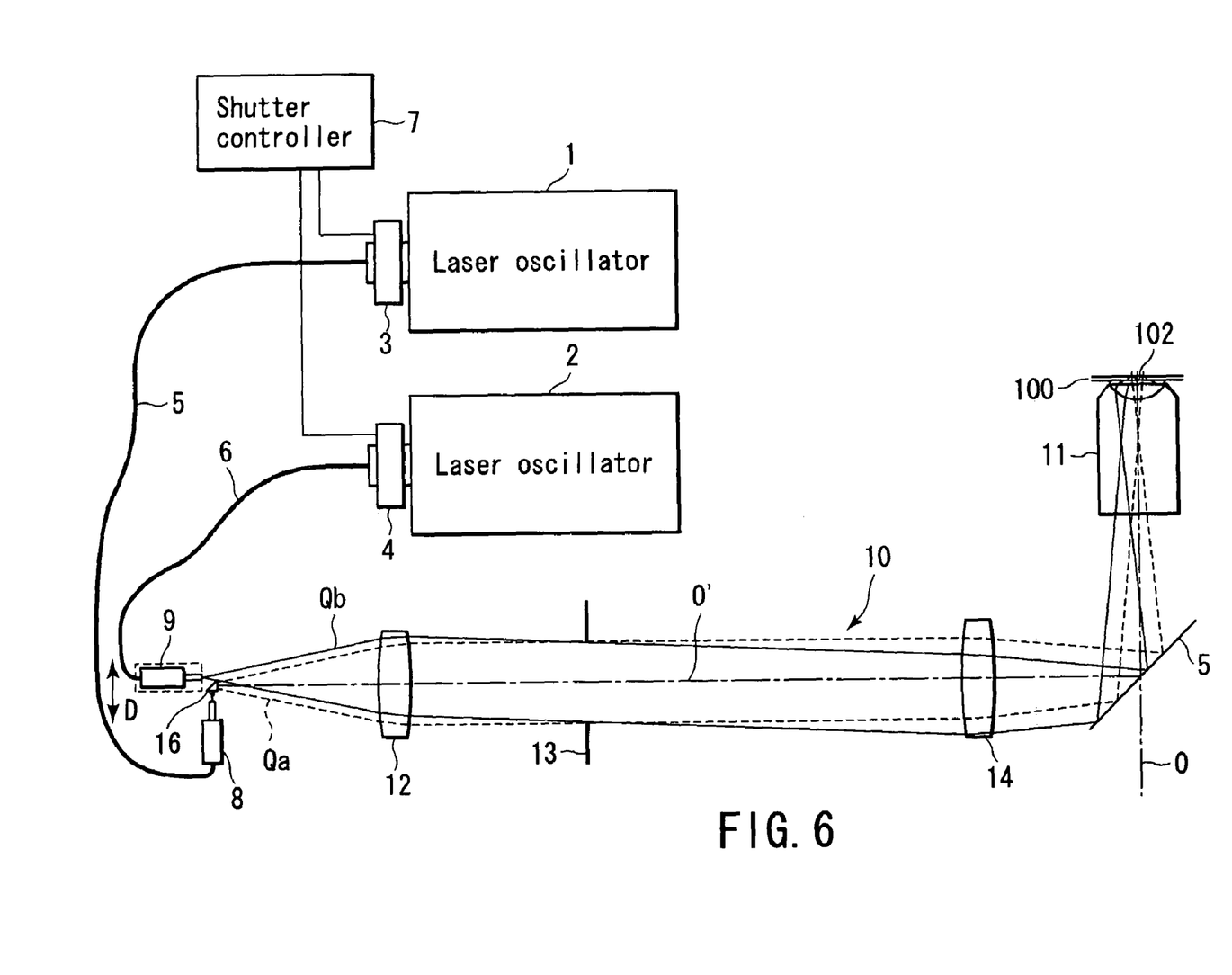
FIG. 6 is a view illustrating another illumination switching apparatus according to the third embodiment of the invention.

To adjust the incident angle of light with respect to the cover slip 100, the entire configuration may be modified as shown in FIG. 6. Specifically, the total reflection microprism 16 is located in the emission direction of the first laser emission section 8 guide the illumination light Qa to the optical axis O' of the illumination system 10. The second laser emission section 9 is offset by a predetermined distance from the optical axis O'. In this state, the second laser emission section 9 may be movable in the directions perpendicular to the optical axis O' (indicated by arrow D).

This adjustment can also adjust the incident angle of the illumination light Qb with respect to the cover slip 100 in the total reflection observation mode.

A fourth embodiment of the invention will be described with reference to FIG. 7. Elements similar to those in FIG. 1 are denoted by corresponding reference numerals, and no detailed description is given thereof.

Figure 7:
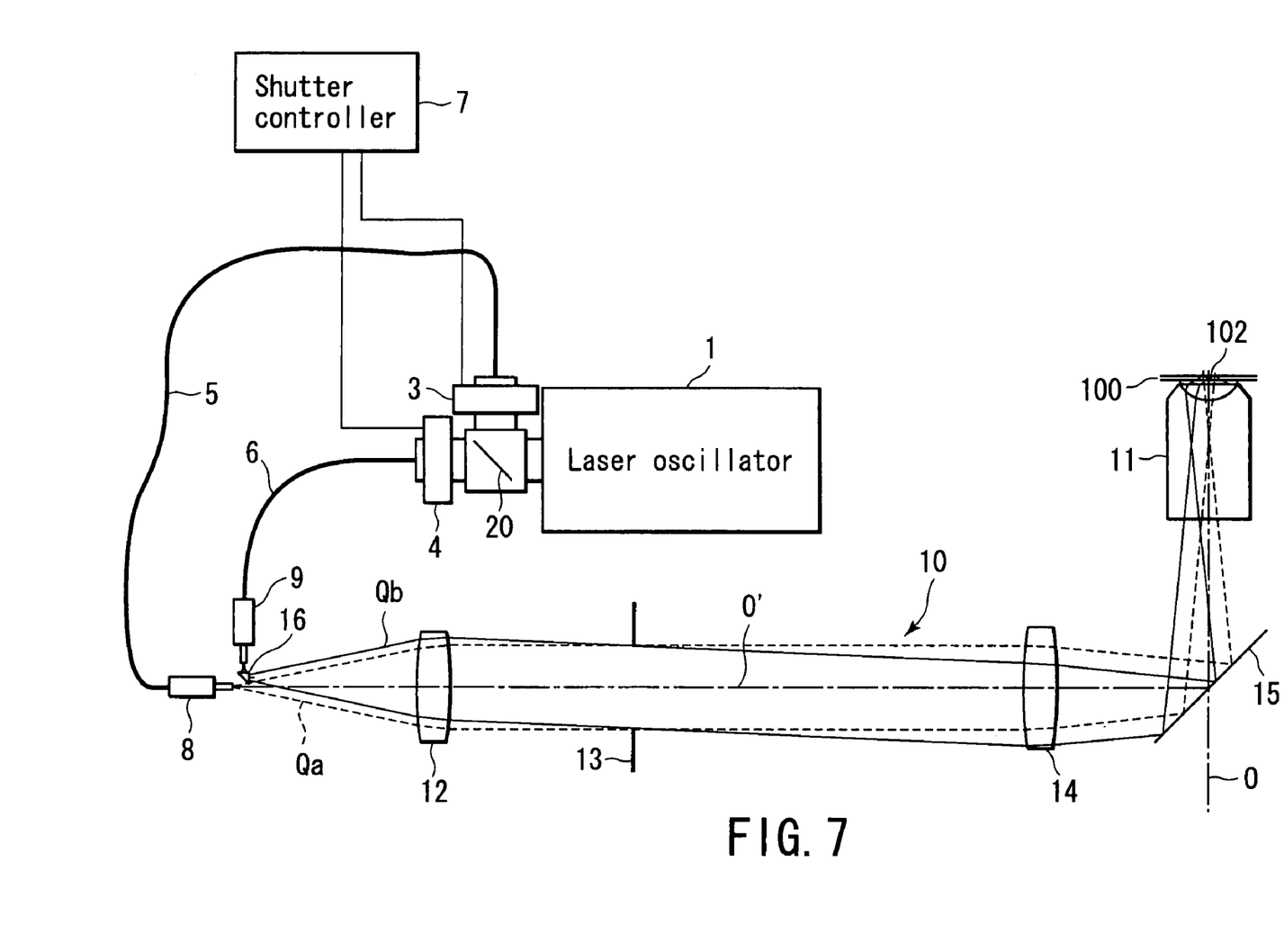
FIG. 7 is a view illustrating an illumination switching apparatus according to a fourth embodiment of the invention.

FIG. 7 shows an illumination switching apparatus, according to the fourth embodiment, which is used in a microscope. As shown, only one laser oscillator 1 is provided, and a beam splitter 20 is attached to the output terminal of the laser oscillator 1. The beam splitter 20 branches, in two directions, the laser beam output from the laser oscillator 1.

First and second shutter mechanisms 3 and 4 are attached to the respective output terminals of the beam splitter 20 provided in the branch directions. A first optical fiber 5 is connected to the laser emission terminal of the first shutter mechanism 3. Similarly, a second optical fiber 6 is connected to the laser emission terminal of the second shutter mechanism 4.

In this structure, a laser beam is emitted from the laser oscillator 1. The laser beam is branched in two directions by the beam splitter 20. One of the branched beams is sent to the first shutter mechanism 3, and the other to the second shutter mechanism 4.

In this state, the shutter controller 7 opens/closes the first and second shutter mechanisms 3 and 4, depending upon whether the mode is in the standard observation mode or total reflection observation mode. The operations performed in the standard observation mode and total reflection observation mode are similar to those in the first embodiment.

As described above, in the fourth embodiment, the laser beam output from the single is branched by the beam splitter 20, and the split beams are switched by the first and second shutter mechanisms 3 and 4. Accordingly, the standard observation mode and total reflection observation mode for observing the sample 102 can be switched from one to the other in a very short period of the order of, for example, 1/100 sec., as in the first embodiment.

The invention is not limited to the above-described first to fourth embodiments, but may be modified in various ways.

Figure 8:
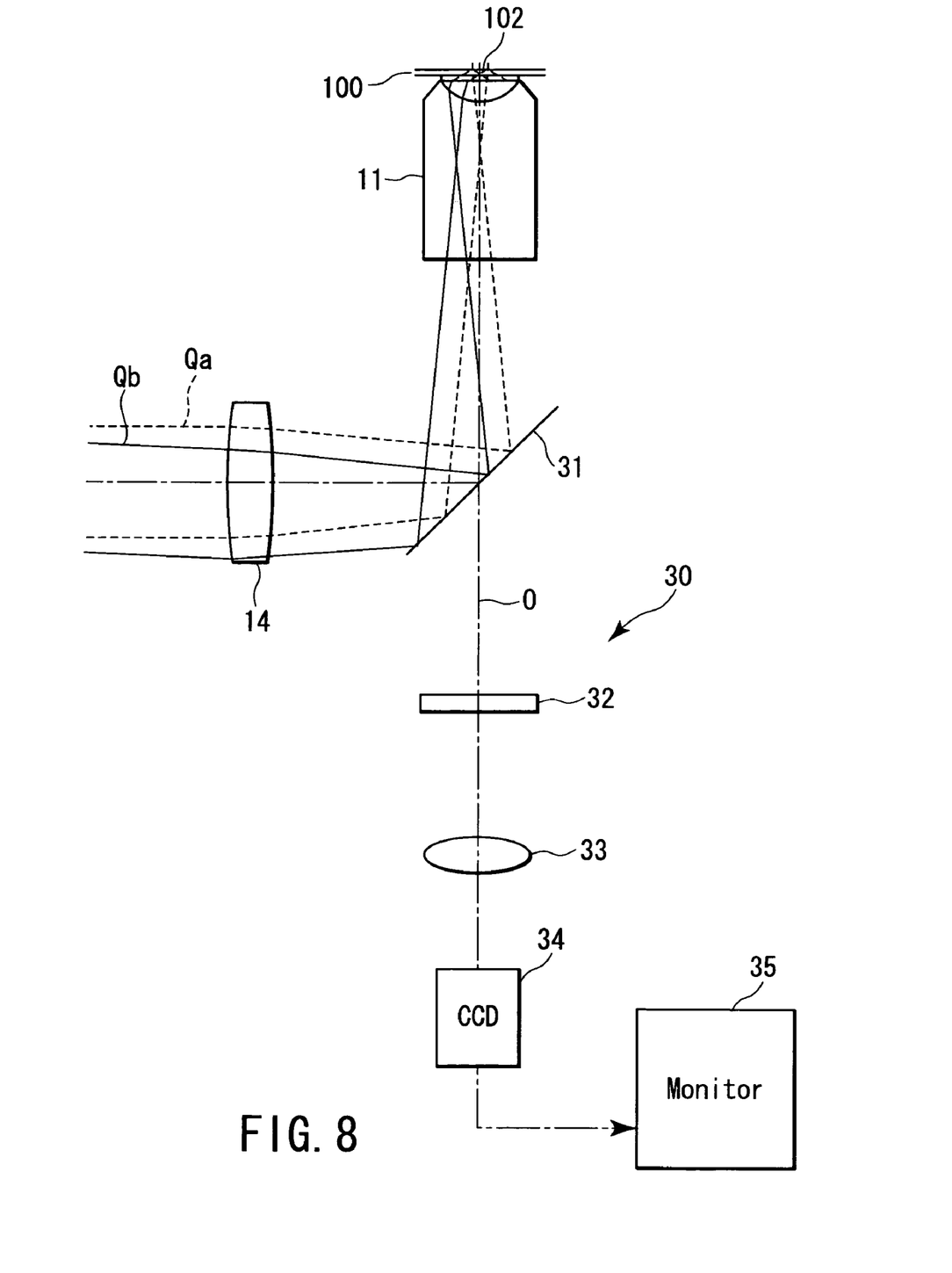
FIG. 8 is a view illustrating an image pickup system provided across the optical observation path of an incident-light illumination system incorporated in the illumination switching apparatuses of the first to fourth embodiments.
Figure 9:
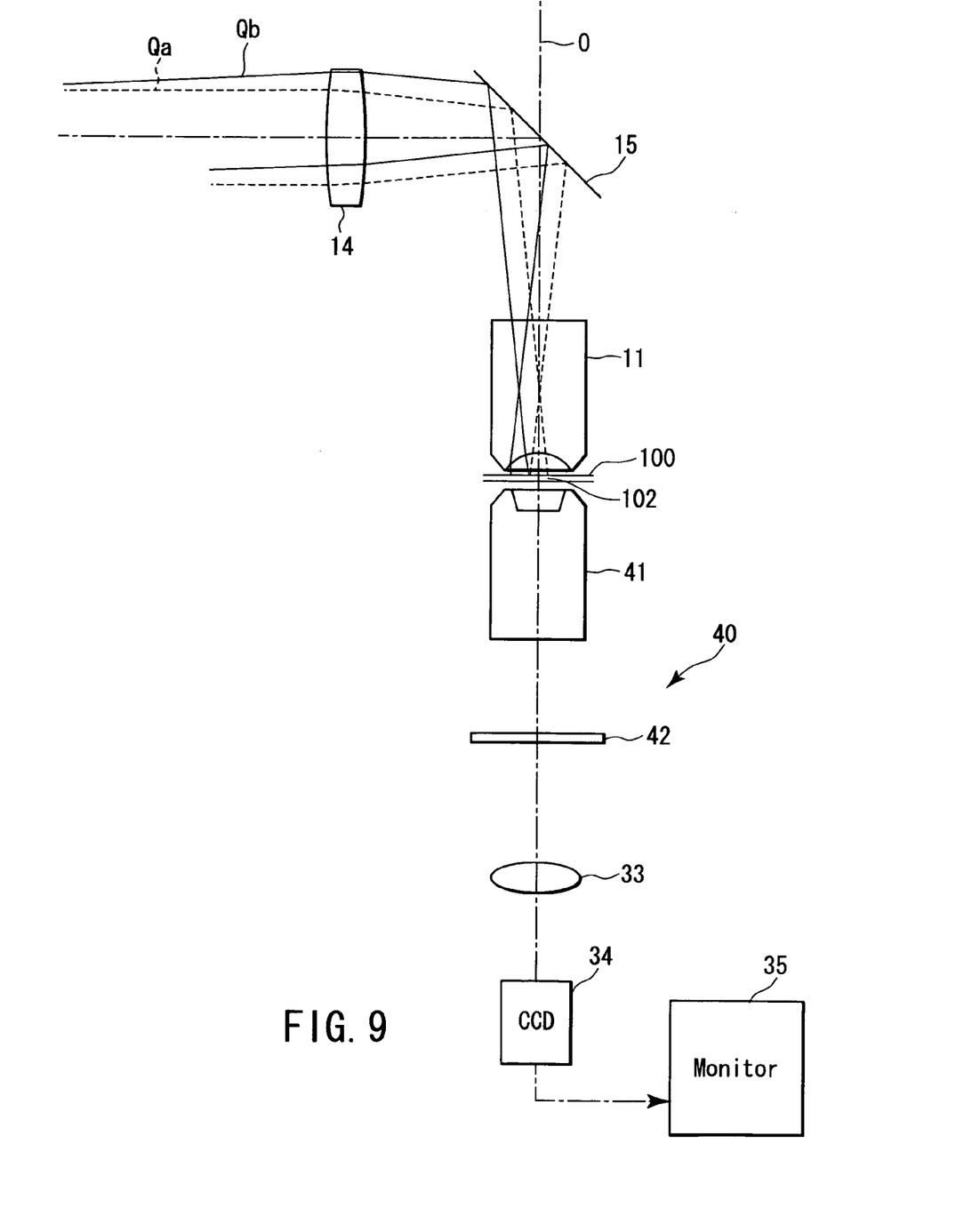
FIG. 9 is a view illustrating an image pickup system provided across the optical observation path of a transillumination system incorporated in the illumination switching apparatuses of the first to fourth embodiments.

For example, each of the first to fourth embodiments can incorporate the image pickup system as shown in FIG. 8 or 9. FIG. 8 shows a case where an image pickup system 30 is provided across the optical axis O of the observation system using incident light, which is incorporated in the first to fourth embodiments. In this case, a beam splitter 31 is provided at the intersection of the optical axis O' of the illumination system and the optical axis O of the observation system. The beam splitter 31 is provided in place of the dichroic mirror 15 in the first to fourth embodiments. The beam splitter 31 reflects illumination light beams Qa and Qb to the objective 11, and transmits an image of the sample from the objective 11, to the image pickup system 30.

A barrier filter 32, image-forming lens 33 and CCD camera 34 are provided along the optical axis O of the observation system. The CCD camera 34 picks an image of the sample 102 formed of light transmitted through the objective 11, beam splitter 31, barrier filter 32 and image-forming lens 33.

The image of the sample 102 is obtained when the sample 102 is illuminated in the standard observation mode or total reflection observation mode, or illuminated while the two modes are alternately switched at high speed.

The CCD camera 34 picks the image of the sample 102 obtained when the sample 102 is illuminated in the standard observation mode or total reflection observation mode, or illuminated while the two modes are alternately switched at high speed. The camera 34 then outputs an image signal indicative of the picked image.

A monitor 35 is connected to the CCD camera 34 for receiving the image signal output from the CCD camera 34 and displaying the image obtained when the sample 102 is illuminated in the standard observation mode or total reflection observation mode, or illuminated while the two modes are alternately switched at high speed.

FIG. 9 shows a case where an image pickup system 40 is provided across the optical axis O of the transillumination observation system incorporated in the first to fourth embodiments. In this case, an observation-side objective 41 is provided across the optical axis O of the observation system. The observation-side objective 41 opposes the objective (illumination-side objective) 11 with the cover slip 100 interposed therebetween. An absorption filter 42, image-forming lens 33 and CCD camera 34 are provided along the optical axis O of the observation system.

The CCD camera 34 picks an image of the sample 102 passing through the observation-side lens 41, absorption filter 42 and image-forming lens 33. The image of the sample 102 is obtained through the illumination-side objective 11 when the sample 102 is illuminated in the standard observation mode or total reflection observation mode, or illuminated while the two modes are alternately switched at high speed.

The CCD camera 34 picks the transmitted image of the sample 102 and outputs an image signal indicative of the picked image. A monitor 35 is connected to the CCD camera 34 for receiving the image signal output from the CCD camera 34 and displaying the image obtained when the sample 102 is illuminated in the standard observation mode or total reflection observation mode, or illuminated while the two modes are alternately switched at high speed.

In the first to third embodiments, three or more laser oscillators may be employed. In this case, the laser beam emitted from one of the laser oscillators is made to pass along the optical axis O' of the illumination system. The laser beams emitted from the other laser oscillators are made to transmit parallel to the optical axis O' in different positions, offset therefrom.

The laser oscillators 1 and 2 may emit laser beams of different waveforms. For example, a wavelength suitable to the purpose of observation of the sample 102 is imparted to each laser beam. By irradiating the sample 102 with a laser beam of a wavelength suitable to the purpose of the observation, the sample 102 can be observed in the standard observation mode or total reflection observation mode.

Figure 10:
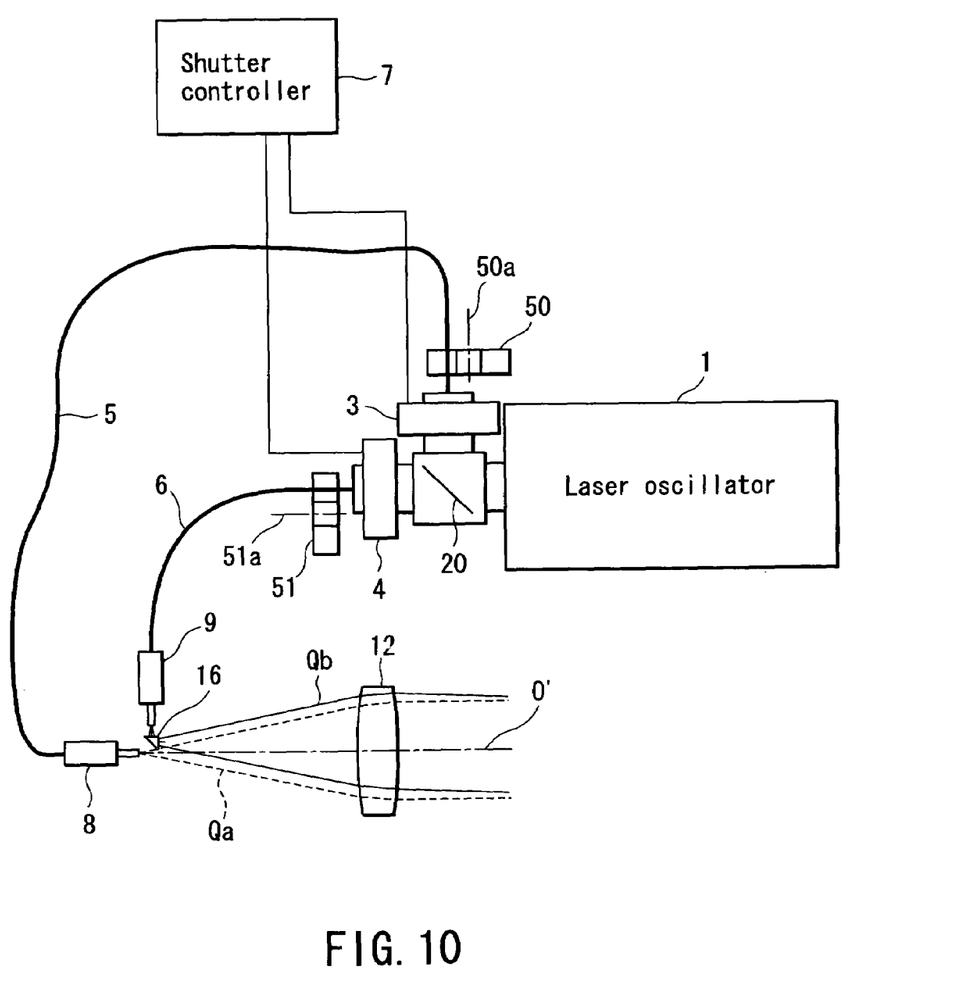
FIG. 10 is a view illustrating a wavelength switching unit provided in the illumination switching apparatus of the invention.

The single laser oscillator 1 shown in FIG. 7 may be replaced with a laser oscillator that can output laser beams of different waveforms. If the laser oscillator 1 is replaced with the one that can output laser beams of different waveforms, wavelength-switching devices 50 and 51 are connected to the optical fibers 5 and 6, respectively, as shown in FIG. 10. Each of the switching devices 50 and 51 has filters of different wavelengths provided on its periphery. The switching devices 50 and 51 are rotated about their respective axes 50a and 51a, thereby setting, across their respective optical paths, a filter of a wavelength needed for observation. This structure can also select illumination light beams Qa and Qb of wavelengths needed for observation.

Figure 11:
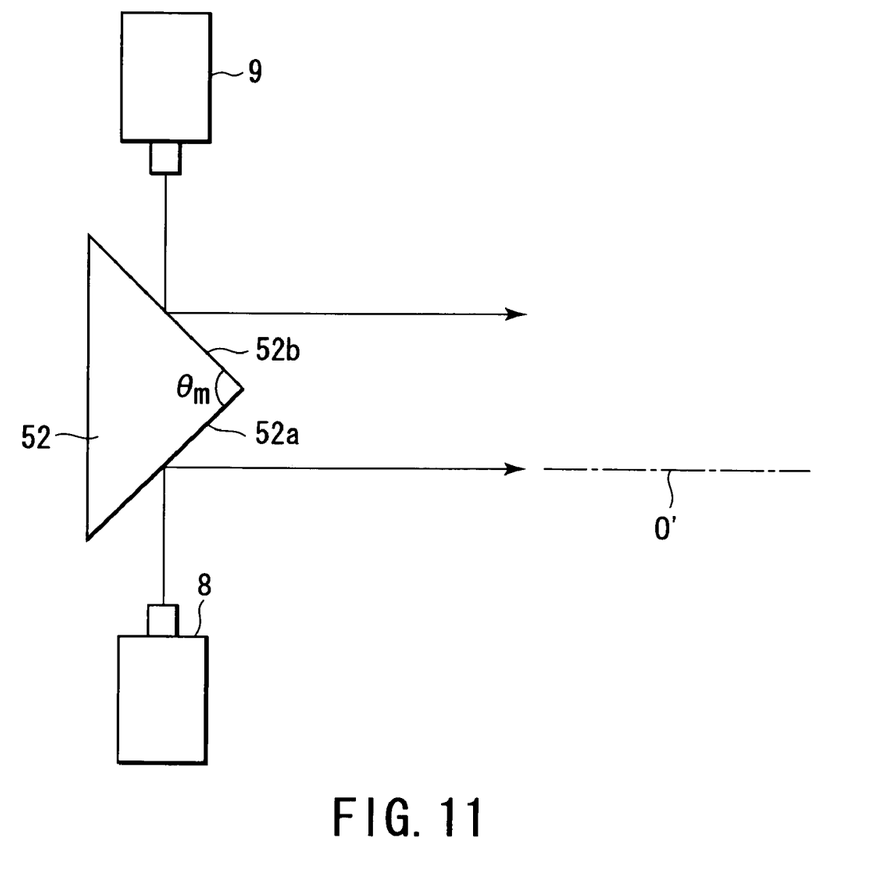
FIG. 11 is a view illustrating a modification of the illumination switching apparatus of the invention.

Although the embodiments employ the laser emission sections 8 and 9 and total reflection microprism 16 to pass the illumination light beams Qa and Qb along the optical axis O' of the illumination system, the invention is not limited to this. Instead of this structure, a triangular mirror 52 may be used as shown in FIG. 11.

The mirror 52 makes the laser beam emitted from, for example, the laser emission section 8 pass along the optical axis O' of the illumination system. More specifically, the mirror 52 makes the laser beam offset from but parallel to the optical axis O'. The mirror 52 has two reflecting surfaces 52a and 52b.

The reflecting surfaces 52a and 52b are coated to form total reflection mirror surfaces. The angle θm between the reflecting surfaces 52a and 52b is determined, for example, in accordance with the incident angle of the first and second laser beams from the first and second laser emission sections 8 and 9. The reflecting surface 52a reflects the first laser beam emitted from the first laser emission section 8 such that it transmits along the optical axis O' of the illumination system. The reflecting surface 52b reflects the second laser beam emitted from the second laser emission section 9 such that it is parallel to but offset from the optical axis O' of the illumination system.

A prism may be used instead of the triangular mirror 52. Even a prism very efficiently reflects a laser beam with little optical loss.

In the embodiments shown in FIGS. 1 and 4 to 7, the laser beam emitted from the laser emission section 8 or 9 is perpendicular to the optical axis O' of the illumination system 10. However, the angle between the laser beam from the emission section 8 or 9 and optical axis O' may assume any optional value. The laser beam is then reflected by, for example, the total reflection microprism 16 such that it is parallel to the optical axis O' of the illumination system 10.

Although in the embodiments, the illumination switching apparatus is employed in a microscope for performing observation using standard fluorescent light and observation using total reflection of fluorescent light, the invention is not limited to this, but is applicable to all apparatuses for switching illumination modes.

What is claimed is:

1. An illumination switching apparatus comprising:
    an objective having a numerical aperture which enables total reflection illumination to be performed on a target;
    at least two light sources including a first light source that comprises a laser oscillator and a second light source that comprises a laser oscillator;
    at least two shutter mechanisms, which include a first shutter mechanism provided across an optical path of a first laser beam emitted by the first light source and a second shutter mechanism provided across an optical path of a second laser beam emitted by the second light source, and which cooperate to selectively permit the laser beam emitted by one of the light sources to be passed therethrough while interrupting the laser beam emitted from another of the light sources;
    an illumination system which guides a received one of the laser beams output from the at least two light sources to the objective; and
    an illumination switching section which selects one of a first optical path and a second optical path, wherein when the first optical path is selected, the first laser beam output from the first light source is guided through the illumination system to travel along an optical axis of the objective to illuminate the target in a standard observation mode, and wherein when the second optical path is selected, the second laser beam output from the second light source is guided through the illumination system and the objective to illuminate the target in a total reflection observation mode.

2. An illumination switching apparatus comprising:
    an objective having a numerical aperture which enables total reflection illumination to be performed on a target;
    a first light source including a first laser oscillator which outputs a first laser beam;
    at least one second light source including a second laser oscillator which outputs a second laser beam;
    an illumination system which guides a received one of the first and second laser beams to the objective;
    a first light transmission section which guides the first laser beam, that is output from the first light source, to a first optical path along which the first laser beam is guided through the illumination system and along an optical axis of the objective;
    a second light transmission section which guides the second laser beam, that is output from the second light source, to a second optical path, along which the second laser beam is guided through the illumination system to realize the total reflection illumination on the target;
    a first illumination switching section which includes a first shutter mechanism provided at a laser output terminal of the first laser oscillator, and which is selectively operable to permit the first laser beam output from the first laser oscillator to be guided to the first light transmission section, and to interrupt the first laser beam; and
    a second illumination switching section which includes a second shutter mechanism provided at a laser output terminal of the second laser oscillator, and which is selectively operable to permit the second laser beam output from the second light source to be guided to the second light transmission section.

3. The illumination switching apparatus according to claim 2, wherein each of the first shutter mechanism and the second shutter mechanism comprises one of a mechanical shutter which is mechanically opened and closed, and an electronic shutter which is electronically opened and closed.

4. The illumination switching apparatus according to claim 2, further comprising a shutter controller which opens the first shutter mechanism and closes the second shutter mechanism in a standard illumination observation mode, and which closes the first shutter mechanism and opens the second shutter mechanism in a total reflection illumination observation mode.

5. The illumination switching apparatus according to claim 2, wherein the respective laser beams output by the laser oscillators have different wavelengths.

6. An illumination switching apparatus comprising:
    an objective having a numerical aperture which enables total reflection illumination to be performed on a target;
    a first laser oscillator which outputs a first laser beam;
    a second laser oscillator which outputs a second laser beam;
    an illumination system which guides a received one of the first and second laser beams to the objective;
    a first shutter mechanism which is selectively operable to pass therethrough and interrupt the first laser beam;
    a second shutter mechanism which is selectively operable to pass therethrough and interrupt the second laser beam;
    a first optical fiber which transmits the first laser beam that has passed through the first shutter mechanism;

a first laser emission section which emits the first laser beam transmitted through the first optical fiber;

a total reflection microprism provided across a first optical path formed in the illumination system for guiding light along an optical axis of the objective, the total reflection microprism reflecting the first laser beam, which has been emitted from the first laser emission section, such that the first laser beam travels through the first optical path;

a second optical fiber which transmits the second laser beam that has passed through the second shutter mechanism;

a second laser emission section provided across a second optical path formed in the illumination system for illuminating the target using total reflection of light, the second laser emission section guiding the second laser beam, transmitted through the second optical fiber, to the second optical path; and a shutter controller which opens the first shutter mechanism and closes the second shutter mechanism in a standard illumination observation mode for observing the target, and which closes the first shutter mechanism and opens the second shutter mechanism in a total reflection illumination observation mode for observing the target.

7. The illumination switching apparatus according to claim 6, wherein the first shutter mechanism is provided at a laser output terminal of the first laser oscillator, and the second shutter mechanism is provided at a laser output terminal of the second laser oscillator.

8. An illumination switching method comprising:

selectively causing a first shutter mechanism to permit to pass therethrough or interrupt a first laser beam output from a first laser oscillator;

selectively causing a second shutter mechanism to permit to pass therethrough or interrupt a second laser beam output from a second laser oscillator;

guiding the first laser beam, which has passed through the first shutter mechanism, along an optical axis of an objective via an illumination system, to illuminate a target by standard observation fluorescent light; and guiding the second laser beam, which has passed through the second shutter mechanism, through the objective via the illumination system, to illuminate the target using total reflection of observation fluorescent light.

9. The illumination switching method according to claim 8, wherein the first shutter mechanism is provided at a laser output terminal of the first laser oscillator, and the second shutter mechanism is provided at a laser output terminal of the second laser oscillator.

* * * * *